United States Patent [19]

Westeppe et al.

[11] Patent Number: 4,945,124
[45] Date of Patent: Jul. 31, 1990

[54] IMPACT RESISTANT POLYAMIDE MOULDING COMPOUNDS MODIFIED WITH SILICONE GRAFT RUBBERS

[75] Inventors: Uwe Westeppe, Remscheid; Christian Lindner, Cologne; Karl-Erwin Piejko, Bergisch-Gladbach; Josef Merten, Korschenbroich, all of Fed. Rep. of Germany

[73] Assignee: Bayer Aktiengesellschaft, Leverkusen, Fed. Rep. of Germany

[21] Appl. No.: 294,216

[22] Filed: Jan. 9, 1989

[30] Foreign Application Priority Data

Jan. 20, 1988 [DE] Fed. Rep. of Germany ....... 3801537

[51] Int. Cl.$^5$ ............................................. C08L 51/08
[52] U.S. Cl. ..................................... 525/63; 525/426; 525/431
[58] Field of Search ........................ 525/63, 426, 431

[56] References Cited

U.S. PATENT DOCUMENTS 4,180,494 12/1979 Fromuth et al. ...................... 525/63
4,473,679  9/1984 Falk et al. ............................. 525/63

Primary Examiner—Melvyn I. Marquis
Assistant Examiner—Karen A. Hellender
Attorney, Agent, or Firm—Connolly and Hutz

[57] ABSTRACT

This invention relates to polyamides which have been modified with special silicone graft rubbers to render them impact resistant and are tough at low temperatures and have high processing stability even at high temperatures and good surface properties.

The moulding compounds, which are distinguished by excellent mechanical properties even at low temperatures, consist of at least 40% by weight of polyamide and special graft rubbers with a multishell core/sheath structure having a silicone-based core.

13 Claims, No Drawings

IMPACT RESISTANT POLYAMIDE MOULDING COMPOUNDS MODIFIED WITH SILICONE GRAFT RUBBERS

This invention relates to polyamides which have been modified with special silicone graft rubbers to render them impact resistant and are tough at low temperatures and have high processing stability even at high temperatures and good surface properties.

The moulding compounds, which are distinguished by excellent mechanical properties even at low temperatures consist of at least 40% by weight of polyamide and special graft rubbers which have a multishell core/sheath structure with a silicone-based core.

Moulded products consisting of polyamides have proved to be very valuable on account of their mechanical strength properties such as rigidity, abrasion resistance, hardness and dynamic and thermal load bearing capacity and the ease with which they can be produced One disadvantage is that they are insufficiently tough.

Numerous proposals have been made for improving the toughness of polyamide moulding compounds by adding other polymers. Polyolefines (DE-A 1 694 802, DE-A 2 038 317, DE-A 69 200, EP-A 72 480) have been proposed for this purpose. Modifiers based on grafted acrylate and diene rubbers produced by special processes are also known (EP-A 3 126, DE-A 2 758 615, DE-A 3 101 771, DE-A 3 120 803).

For many applications, however, it has been found that the products are not entirely satisfactory in use. Special demands are made on these products, in particular at low temperatures, and the user also requires the products to be satisfactorily processed, even at high temperatures.

This invention relates to polyamide moulding compounds which are distinguished by excellent mechanical properties even at low temperatures and are produced from at least 50% by weight of polyamide and a silicone graft rubber having a special structure. The moulding compounds are further characterised by their high processing stability even at elevated temperatures in combination with high resistance to ageing under environmental influences.

The invention thus relates to polyamide moulding compounds which are tough at low temperatures and are resistant to ageing and to the conditions of processing which compounds are composed of I. at least 40 parts by weight and up to 99 parts by weight, preferably from 60 to 85 parts by weight, especially from 65 to 80 parts by weight of a thermoplastic polyamide I and II. from 60 to 1 parts by weight, preferably from 15 to 40 parts by weight, especially from 20 to 35 parts by weight of a particulate graft rubber II composed of
   (a) a core of 0.1 to 90 parts by weight of a cross-linked silicone rubber,
   (b) a first shell of 99.9 to 10 parts by weight of a cross-linked acrylate rubber and
   (c) a second shell consisting of a polymer or copolymer of monomers selected from styrene, α-methylstyrene, acrylonitrile and acrylic (meth)acrylate, the ratio by weight of (a+b):c being in the range of from 7:15 to 19:3.

The above-mentioned parts by weight should preferably add up to 100.

These polyamide moulding compounds may contain the usual quantities of known additives (e.g. stabilizers, processing auxiliaries, flame-retardants, fillers or reinforcing materials).

The moulding compounds according to the invention are distinguished by their good mechanical properties, in particular their great toughness at low temperatures. Other advantageous properties of these compounds include their age resistance, the wide range of conditions under which they can be processed and the excellent raw tone of the moulding compounds. Their toughness at low temperature is better than that of acrylate rubbers and their effectiveness or activity is greater than that of other known silicone rubbers. The graft rubbers are also surprisingly found to have a high processing stability in spite of their high acrylate content.

The polyamide component I) of the moulding compounds according to the invention may be any polyamide, in particular Polyamide-6. Polyamide-6,6 and any partially crystalline copolyamides based on these two components. Partially crystalline polyamides may also be used, in particular those in which the acid component is partly or completely (apart from adipic acid or caprolactam) composed of terephthalic acid and/or isophthalic acid and/or suberic acid and/or sebacic acid and/or azelaic acid and/or dodecane diacid and/or adipic acid and/or a cyclohexane dicarboxylic acid and the diamine component consists partly or completely in particular of m- and/or p-xylylene diamine and/or hexamethylene diamine and/or 2,2,4- and/or 2,4,4-trimethylhexamethylenediamine and/or isophorone diamine, the compositions of which are known in the art.

Partially crystalline polyamides prepared partly or completely from lactams containing 6 to 12 carbon atoms, optionally with the addition of one or more of the abovementioned starting components, should also be mentioned.

Polyamide-6 and Polyamide-6,6 and copolyamides containing only small proportions (up to about 10% by weight) of the cocomponents are particularly preferred partially crystalline polyamides I).

Amorphous polyamides may also be used as polyamide component I). These are obtained by the polycondensation of diamines, e.g. ethylenediamine, hexamethylenediamine, decamethylenediamine, 2,2,4- and/or 2,4,4-trimethyl-hexa-methylenediamine, m- and/or p-xylylenediamine, bis-(4-aminocyclohexyl)-methane or mixtures of 4,4'-, or 2,2'-diaminodicyclohexylmethanes, 2,2-bis-(4-aminocyclohexyl)-propane, 3,3'-dimethyl-4,4'-diamino-dicyclohexylmethane, 3-aminomethyl-3,5,5-trimethyl-cyclohexylamine, 2,5- and/or 2,6-bis-(aminomethyl)-norbornane and/or 1,4-diamino-methyl-cyclohexane with dicarboxylic acids, e.g. oxalic acid, adipic acid, azelaic acid, decanedicarboxylic acid, heptadecanedicarboxylic acid, 2,2,4- and/or 2,4,4-trimethyl-adipic acid. isophthalic acid or small quantities of terephthalic acid. Amorphous copolymers obtained by the polycondensation of several monomers are, of course, also suitable, as well as copolymers which have been prepared with the addition of aminocarboxylic acids such as ε-aminocaproic acid, ω-aminoundecanoic acid or ω-aminododecanoic acid or their lactams.

For amorphous polyamides, it is preferable to include at least one component which is asymmetric in structure. e.g. isophorone diamine or isophthalic acid, or has been asymmetrically substituted (2,2,4-trimethyladipic acid) or mixtures of (stereo)isomers.

Particularly suitable amorphous polyamides are the polyamides prepared from isophthalic acid, hexamethylene diamine and other diamines, such as 4,4'-diaminodicyclohexylmethane, isophorone diamine, 2,2,4- and/or 2,4,4-trimethyl-hexamethylenediamine and 2,5- and/or 2,6-bis-(aminomethyl)-norbornane; or from isophthalic acid, 4,4'-diamino-dicycohexylmethane and ε-caprolactam; or from isophthalic acid, 3,3'-dimethyl-4,4'-diamino-dicyclohexylmethane and lauric lactam; or from terephthalic acid and the isomeric mixture of 2,2,4- and/or 2,4,4-trimethylhexamethylenediamine.

Mixtures of the position isomers of diaminodicyclohexylmethanes composed of 70 to 99 mol-% of the 4,4'-diamino isomer, 1 to 30 mol-% of the 2,4'-diamino isomer, 0 to 2 mol-% of the 2,2'-diamino isomer and optionally correspondingly more highly condensed diamines obtained by the hydrogenation of diaminodiphenylmethane of commercial quality may be used instead of pure 4,4'-diaminodicyclohexylmethane. Up to 30% of the isophthalic acid may also be replaced by terephthalic acid.

Particulate graft polymers (II) for the purpose of this invention consist of a core (a) of a particulate, cross-linked silicone rubber, a first shell (b) of a cross-linked acrylate rubber and a second shell (c) of a polymer or copolymer of resin-forming monomers, (b) and (c) existing predominantly as graft polymers on the given graft basis.

The ratio by weight of the core (a) to the first shell (b) is in the range of 0.1-99.9 to 90:10, preferably from 30:70 to 80:20, and the proportion of (c) in the whole graft polymer (II) amounts to 85 to 25% by weight, preferably from 80 to 40% by weight. Graft polymers (II) in which the figures given above represent percentages by weight are particularly preferred. The graft polymers according to the invention have average particle diameters ($d_{50}$) of from 0.05 to 10 μm, preferably from 0.1 to 2 μm. Particle diameters in the range of 0.1 to 1 μm are particularly preferred (for method of measurement, see W.Scholtan and H.Lange. Kolloid-Zeitschrift und Zeitschrift f',uml/u/ r Polymere, 250 (1972), pages 787-796).

The core (a) consists of a cross-linked silicone rubber and contains units corresponding to the following general formulae:

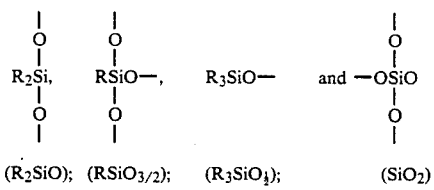

where R stands for a monovalent organic group.

The quantities of the individual siloxane units are calculated to provide from 0 to 10 mol of units of the formula $RSiO_{3/2}$; from 0 to 1.5 mol of units of the formula $R_3SiO_{1/2}$ and from 0 to 3 mol of units of the formula $SiO_2$ per 100 mol of units of the formula $R_2SiO$.

R may stand for a monovalent, saturated hydrocarbon group with 1 to 18 carbon atoms, the phenyl group or an alkoxy group or a group which can be attacked by a radical, such as a vinyl or γ-mercaptopropyl group. Preferably, at least 80% of all the groups R are methyl groups. A combination of methyl and ethyl groups is particularly preferred.

Preferred silicone rubbers (a) have groups capable of radical reactions incorporated therein, i.e. groups which are capable of radical addition or transfer reactions, in particular vinyl, allyl, chloroalkyl and mercapto groups, preferably in quantities of 2 to 10 mol-%, based on all the groups R.

The first shell (b) is a cross-linked acrylate rubber, in particular a cross-linked (graft) polymer (predominantly graft polymer) of acrylic acid alkyl esters, optionally in admixture with up to 40% by weight of other vinyl monomers. Suitable polymerisable acrylic acid esters include $C_1$-$C_8$-alkyl esters such as methyl, ethyl, butyloctyl and 2-ethyl hexyl esters, halogenated alkyl esters, preferably $C_1$-$C_8$-halogenated alkyl esters such as chloroethylacrylate, and aromatic esters such as benzylacrylate and phenethylacrylate. They may be used singly or as mixtures. The latter should contain at least one alkyl ester. To achieve cross-linking. difunctional or higher functional monomers ("polyfunctional" monomers) are copolymerised. The following are examples: Esters of unsaturated carboxylic acids with a polyol (preferably with 2 to 20 carbon atoms in the ester group), such as ethylene glycol dimethacrylate, esters of a polybasic carboxylic acid and an unsaturated alcohol (preferably with 8 to 30 carbon atoms in the ester moiety) such as triallyl cyanurate or triallylisocyanurate; divinyl compounds such as divinylbenzene: esters of unsaturated carboxylic acids and unsaturated alcohols (preferably with 6 to 12 carbon atoms in the ester group), such as allylmethacrylate; phosphoric acid esters such as triallylphosphate and 1,3,5-trisacryloyl-hexahydro-s-triazine and alkylene-bis-acrylamides. Triallylcyanurate, triallylisocyanurate, triallylphosphate and allyl methacrylate are particularly preferred polyfunctional monomers. The quantity of polyfunctional monomers used for cross-linking is preferably from 0.05 to 5.0% by weight of the mass of the first shell (b).

The cross-linked graft acrylate rubber of the first shell (b) may in addition contain a copolymerisable monomer or several such monomers of the vinyl or vinylidene type incorporated by polymerisation. The following are examples: Methylmethacrylate, butylacrylate, acrylonitrile, styrene, α-methylstyrene, acrylamides and vinyl alkyl ethers. These copolymers may be incorporated by polymerisation in quantities of up to 40% by weight of polymer (b).

The second shell (c) is a graft polymerised polymer of polymerisable monomers selected from α-methylstyrene, styrene, acrylonitrile, alkyl(meth)acrylates containing up to 8 carbon atoms in the alcohol moiety, maleic acid derivatives, in particular maleimide, and vinyl acetate. Copolymers of at least two monomers selected from styrene, α-methylstyrene, acrylonitrile, alkylmethacrylate and alkylacrylate are particularly preferred. Copolymers containing more than 60% by weight of alkylmethacrylate are also especially preferred. The graft polymers are known and are prepared as follows:

An emulsion of the core material (a) is prepared in a first stage:

The preparation of an emulsion of a long chained, OH-terminated silicone oil by emulsion polymerisation has already been described, e.g. in US-PS 2 891 910 and GB-PS 1 024 024, and is hereby introduced into the present description. The process disclosed in the British Patent Specification of using an alkyl benzene sulphonic acid is particularly preferred as this serves both as emulsifier and polymerisation catalyst. After polymerisation, the acid is neutralised.

The concentration of emulsifier may therefore be kept low and the finished product only contains a small quantity of undesirable foreign molecules from the catalyst. However n-alkylsulphonic acids may also be used instead of the above-mentioned alkylbenzene sulphonic acids and other emulsifiers may be used as coemulsifiers in addition to the catalytically active sulphonic acid.

These coemulsifiers may be non-ionic or anionic.

Silicone oils which have been prepared by emulsion polymerisation in the presence of non-ionogenic coemulsifiers generally have a lower molecular weight than those prepared without coemulsifier. The molecular weight of the OH-terminated silicone oil obtained from emulsion polymerisation may further be controlled, for example, by the temperature at which equilibrium is established between the siloxane, water and the silane oil initially formed by ring opening of the siloxane.

The incorporation of groups capable of reaction of their radicals in the preferred silicone copolymer may be effected by operating in the presence of suitable siloxane oligomers. Examples of suitable starting oligomers include tetramethyl tetravinyl cyclotetrasiloxane and γ-mercaptopropyl methyl dimethoxysilane and its hydrolysate.

These functional oligomers may be added in the required quantities to octamethyl-cyclotetrasiloxane which is the basic oligomer used for copolymerisation.

The incorporation of relatively long-chained alkyl groups R such as ethyl or propyl groups or the like and the incorporation of phenyl groups may be achieved in analogous manner.

The silicone graft basis must be at least partially cross-linked.

Sufficient cross-linking may take place, for example, when the preferred vinyl or mercaptopropyl groups react with each other in the process of emulsion polymerisation of the silicone components, in which case it may be unnecessary to add an external cross-linking agent. A silane may nevertheless be added for cross-linking in order to increase the degree of cross-linking of the silicone rubber.

Branching points or cross-linking points may be incorporated, for example, by the addition of tetraethoxysilane or a silane of the general formula RSiX$_3$, where X stands for a hydrolysable group, in particular an alkoxy group, and R has the meaning described above. R=methyl and R=phenyl are preferred. Methyltrimethoxysilane and phenyltrimethoxysilane as well as tetraethoxysilane are particularly preferred.

In the second stage of the process according to the invention, the acrylate rubber for the first shell (b) is prepared by emulsion polymerisation in the presence of the silicone rubber latex of the first stage by emulsifying the monomers (main component at least one acrylate) in the silicone latex and polymerising in known manner with the aid of radical forming initiators. The acrylate rubber is predominantly grafted on the silicone rubber core.

It may already be cross-linked at the stage of its preparation by including polyfunctional monomers. This procedure is preferred.

In this graft polymerisation of the first shell (b), the formation of new particles must if possible be completely prevented. An emulsion stabilizer must be present in the quantity required to cover the surface of the particles. The size of these particles may be varied within wide limits by the reaction conditions. When an agglomerated latex is used as core (a) for obtaining large particles, these large particles may contain several small silicone rubber particles. Polymerisation of the first shell (b) may also be carried out by producing particles containing silicone rubber and at the same time particles of pure cross-linked acrylate rubber. Such mixtures may in special circumstances be used for the production of high impact strength moulding compounds.

After graft polymerisation of the acrylate rubber has been terminated, a vinyl monomer or a mixture of monomers is (graft) polymerised in emulsion on the latex obtained. The graft polymers according to the invention are thus formed with the formation of the second shell (c). In this process of graft polymerisation, which basically is already known and which is conventionally carried out in the presence of radical starters such as water-soluble initiators, emulsifiers or complex formers/grafting activators as well as regulators, a certain amount of free polymers or copolymers of the monomers forming the second shell (c) generally forms in addition to the graft polymer proper. The quantity of this ungrafted polymer may be characterised by the degree of grafting or the grafting yield and depends inter alia on the polymerisation conditions, the composition of the first shell (b), the size of the particles to be grafted and the quantity of grafted acrylate rubber. "Graft polymer" in the context of the present invention therefore denotes the product of polymerisation of vinyl monomers, consisting of a mixture of graft polymers together with an inevitable proportion of free copolymer of the graft monomers.

The graft polymers according to the invention prepared as described above may be worked up by known processes, e.g. by coagulation of the latices with electrolytes (salts, acids or mixtures thereof) followed by purification and drying.

The polyamides I should preferably have a relative viscosity (determined on a 1% by weight solution in m-cresol at 25° C.) of from 2.0 to 5.0, preferably from 2.5 to 4.0.

The moulding compounds according to the invention may contain conventional additives such as lubricants and mould release agents, nucleating agents, stabilizers, fillers and reinforcing materials, flame retardants, dyes, thermostabilizers, antioxidants and/or light protective agents.

The moulding compounds may be prepared by mixing the components together in conventional mixing apparatus such as rollers, kneaders or single shaft or multi-shaft extruders.

The temperature employed for the preparation of the mixtures should be at least 10 degrees Centigrade and preferably not more than 90 degrees Centigrade above the polyamide melting point. In view of their properties, the moulding compounds are suitable for injection moulding or extrusion wherever the properties described are demanded. e.g. in the motor vehicle industry for shock absorbers and car body parts and in the sports and leisure-time industry.

EXAMPLES

Components employed

I. Polyamide

Polyamide-6 having a relative viscosity (determined on a 1% by weight solution in m-cresol at 25° C.) of 3.5

II. Preparation of the graft polymers (according to the invention)

(a) Preparation of a silicone emulsion 38.4 Parts by weight of octamethylcyclotetrasiloxane, 1.2 parts by weight of tetramethyl tetravinyl cyclotetrasiloxane and 1 part by weight of γ-mercaptopropyl methyl dimethoxysilane are stirred together. 0.5 parts by weight of dodecylbenzene sulphonic acid is added, followed by 58.4 parts by weight of water which is added within one hour with vigorous stirring. The pre-emulsion is homogenised twice at 200 bar in a high pressure emulsifying machine. A further 0.5 parts by weight of dodecylsulphonic acid is added.

The emulsion is then stirred at 85° C. for 2 hours and at room temperature for 36 hours. It is then neutralized with 1N NaOH. 100 Parts by weight of a stable emulsion having a solids content of about 37% (determined according to DIN 53 182) are obtained. The particle size is 285 nm (average value $d_{50}$) The gel content of the polymer is 83% by weight.

(b) Preparation of silicone emulsions having a crosslinked acrylate shell in accordance with the invention X Parts by weight of the silicone emulsion (a) described above and Y parts by weight of water are introduced into a reactor. An initiator solution of Z parts by weight of potassium peroxydisulphate in 100 parts by weight of water is added at 70° C. Two feeds are then run into the reactor at 70° C. and within 5 hours and the mixture is stirred for a further 4 hours at 70° C. Latices having solids contents of 36% by weight are obtained.

Quantities used

|  | B1 | B2 | B3 | B4 | B5 |
|---|---|---|---|---|---|
| Type of polymer |  |  |  |  |  |
| X | 4147 | 3687 | 3227 | 2765 | 3686 |
| Y | 79 | 70 | 251 | 523 | 71 |
| Z | 2.5 | 3.0 | 3.3 | 3.5 | 3.0 |
| Feed 1 |  |  |  |  |  |
| NBA | 173 | 345 | 518 | 690 | 345 |
| TAC | 0.5 | 1.0 | 1.5 | 2.0 | 4.0 |
| Feed 2 |  |  |  |  |  |
| Emulsifier | 4.0 | 7.0 | 10.0 | 14.0 | 7.0 |
| Water | 265 | 560 | 660 | 660 | 560 |
| Properties of the emulsions: |  |  |  |  |  |
| Average particle size [nm] ($d_{50}$) | 290 | 300 | 310 | 350 | 305 |
| Silicone (a) content of the polymer (% by wt.) | 90 | 80 | 70 | 60 | 80 |

NBA = n-butyl acrylate
TAC = triallylcyanurate
Emulsifier = sodium salts of $C_{14}$-$C_{18}$-alkyl sulphonic acids

(c) Graft polymers according to the invention

A mixture of water (130 parts by weight) and 3069 parts by weight of emulsion (B1-B5) is introduced into the reactor. An initiator solution of 2.5 parts by weight of potassium peroxydisulphate in 50 parts by weight of water is added at 70° C. Two feeds are then run in at a uniform rate into the reactor within 4 hours and the mixture is left to polymerise for 4 hours, when polymerisation is complete.

| Feed 1: | 400 parts | by weight of methyl methacrylate |
|---|---|---|
|  | 47.5 parts | by weight of n-butylacrylate |
|  | 28.5 parts | by weight of tert.-butylacrylate |
| Feed 2: | 7.5 parts | by weight of the sodium salt of $C_{14}$-$C_{18}$-alkyl sulphonic acids |
|  | 500 parts | by weight of water. |

The emulsions obtained contain graft polymers C of 70% by weight of rubber B and 30% by weight of a terpolymer of methyl methacrylate, n-butylacrylate and tert.-butylacrylate.

| Graft polymers prepared: | C1 | C2 | C3 | C4 | C5 |
|---|---|---|---|---|---|
| Rubber basis | B1 | B2 | B3 | B4 | B5 |

The graft polymers are coagulated with aqueous $MgSO_4$ solution at 80 to 95° C., washed and worked up into a powder.

Comparison graft polymer C 6

A graft polymer containing only component (a) as rubber basis and no acrylate rubber component as in procedure (b) is prepared. Preparation and isolation of the graft polymers were carried out as in (c), introducing a total quantity of latex (a) and water of 3199 parts by weight to which was added the same quantity of rubber as for the preparation of (c).

III. Preparation and testing of the moulding compounds

The polyamide component was melted in a continuously operating double shaft extruder and the graft rubbers were added. The cylinder temperatures ranged from 280 to 290° C. The molten strand was introduced into water, granulated and dried.

Test rods measuring 80×10×4 mm were prepared from the moulding compounds in a conventional injection moulding machine. The properties tested were the modulus in flexure (DIN 53 457) and the notched impact strength ($a_k$) according to Izod (ISO 180) at various temperatures, and the transition from brittle to tough was determined from the results.

The composition and properties of the moulding compounds are shown in Table 1.

TABLE 1

| Example | Type of graft polymer | Modulus in flexure [MPa] | RT | $a_k$ −20° C. [kJ/m$^2$] | −40° C. | Tough/brittle transition [°C.] |
|---|---|---|---|---|---|---|
| 1 | C1 | 1579 | 58.6 | 18.4 | — | +10/0 |
| 2 | C2 | 1644 | 92.0 | 73.2 | 37.7 | −30/−40 |
| 3 | C3 | 1728 | 96.5 | 79.2 | 61.5 | −40/−50 |
| 4 | C4 | 1732 | 87.9 | 88.5 | 68.8 | −40/−50 |
| 5 | C5 | 1706 | 90.5 | 75.3 | 37.1 | −30/−40 |

TABLE 1-continued

| Example | Type of graft polymer | Modulus in flexure [MPa] | RT | $a_k$ −20° C. [kJ/m²] | −40° C. | Tough/brittle transition [°C.] |
|---|---|---|---|---|---|---|
| 6* | C6 | 1592 | 11.0 | — | — | >RT |

*Comparison experiment
RT = room temperature
$a_k$ = notched impact strength

All the moulding compounds are distinguished by their light colour but the strand from Example 6 is rough (poor surface) in contrast to those obtained from the moulding compounds according to the invention (Examples 1-5).

We claim:

1. A thermoplastic moulding composition comprising
(I) 40-99 parts by weight, of a partially crystalline or amorphous polyamide and
(II) 60-1 parts by weight of a graft rubber, having
(a) a core of 0.1 to 90 parts by weight of a cross-linked silicone rubber, wherein the silicone rubber core contains $R_2SiO$ with from 0 to 10 molar units of the formula $RSiO_{3/2}$, from 0 to 1.5 molar units of the formula $R_3SiO_{1/2}$ and from 0 to 3 molar units of the formula $SiO_2$ per 100 molar units of the formula $R_2SiO$, wherein R is a saturated hydrocarbon group having 1-18 carbon atoms, phenyl, alkoxy, vinyl or γ-mercaptopropyl;
(b) a first shell of 99.9 to 10 parts by weight of a cross-linked acrylate rubber, graft polymerized on (a), which comprises polymerized alkyl acrylate esters and
(c) a second shell of resin forming graft polymerized vinyl monomers or mixtures of monomers which are α-methylstyrene, styrene, acrylonitrile, alkyl(meth)acrylates or maleic acid derivatives or vinyl acetate or mixtures thereof;
the ratio by weight of the sum of (a)+(b):(c) being in the range of from 7 : 15 to 19 : 3.

2. A moulding composition as claimed in claim 1 comprising 65-80 parts by weight of polyamide (I).

3. A moulding composition as claimed in claim 1 wherein the graft rubber (II) comprises 20-35 parts by weight.

4. A moulding composition as claimed in claim 1 wherein the core (a) consists of 30-80 parts by weight of a particulate, cross-linked silicone rubber.

5. A moulding composition as claimed in claim 1 wherein for the crosslinked silicone rubber core (a) the group R is a saturated hydrocarbon groups with 1 to 18 carbon atoms, phenyl, alkoxy, vinyl, allyl, chloroalkyl or mercapto.

6. A moulding composition as claimed in claim 5 wherein the saturated hydrocarbon group is methyl.

7. A moulding composition as claimed in claim 5 wherein R comprises vinyl, allyl, chloroalkyl or γ-mercaptopropyl in quantities of from 2 to 10 mol %, based on all the groups R.

8. A moulding composition as claimed in claim 1 wherein the first shell (b) over the cross-linked silicone rubber core (a) consists of a cross-linked, predominantly graft-acrylate rubber, based on polymerized acrylic acid ester monomers difunctional or higher functional crosslinking monomers and up to 40% by weight, of other vinyl monomers.

9. A moulding composition as claimed in claim 8 wherein the ester monomers of shell (b) are acrylic $C_1$-$C_8$ -alkyl or aromatic acrylates, and the other vinyl monomers are methyl methacrylate, butylacrylate, acrylonitrile, styrene, α-methylstyrene, acrylamides, vinyl acrylic ethers or mixtures thereof.

10. A moulding composition as claimed in claim 8 wherein the quantity of the crosslinking monomer amounts to 0.05 to 5.0% by weight of the shell (b).

11. A moulded part produced by moulding a melt of the composition as claimed in claim 1.

12. A process for the production of an impact resistant, thermoplastic moulding composition which comprises mixing a melt of the partially crystalline or amorphous polyamides (I) with the graft rubber (II) as defined in claim 1.

13. A moulding composition as claimed in claim 9 wherein the ester monomers contain at least one $C_1$-$C_8$-alkyl acrylate.

* * * * *